(12) United States Patent
Dubs et al.

(10) Patent No.: US 7,769,927 B2
(45) Date of Patent: Aug. 3, 2010

(54) APPARATUS, SYSTEM, AND METHOD FOR ACCELERATION INITIATED ASSOCIATION

(75) Inventors: Justin Tyler Dubs, Durham, NC (US); James Joseph Thrasher, Efland, NC (US); Jennifer Greenwood Zawacki, Hillsborough, NC (US)

(73) Assignee: Lenovo (Singapore) Pte. Ltd., Tech Park (SG)

( * ) Notice: Subject to any disclaimer, the term of this patent is extended or adjusted under 35 U.S.C. 154(b) by 390 days.

(21) Appl. No.: 11/780,325

(22) Filed: Jul. 19, 2007

(65) Prior Publication Data

US 2009/0024770 A1  Jan. 22, 2009

(51) Int. Cl.
*G06F 3/00* (2006.01)
(52) U.S. Cl. .................. 710/58; 340/10.42; 370/912
(58) Field of Classification Search .................. 710/58; 340/10.42; 370/912
See application file for complete search history.

(56) References Cited

U.S. PATENT DOCUMENTS

| 6,892,052 | B2 * | 5/2005 | Kotola et al. ............... 455/41.2 |
| 7,356,347 | B1 * | 4/2008 | Kammer ....................... 455/517 |
| 7,427,926 | B2 * | 9/2008 | Sinclair et al. ............ 340/825.2 |
| 2007/0003061 | A1 * | 1/2007 | Jung et al. ..................... 380/270 |
| 2007/0213045 | A1 * | 9/2007 | Hermansson et al. ....... 455/425 |

\* cited by examiner

*Primary Examiner*—Henry W. H. Tsai
*Assistant Examiner*—Elias Mamo
(74) *Attorney, Agent, or Firm*—Kunzler Needham Massey & Thorpe

(57) ABSTRACT

An apparatus, system, and method are disclosed for acceleration initiated association. A peripheral knock module receives a first knock command from a first accelerometer of a peripheral device. The first knock command comprises a plurality of peripheral time stamps for a plurality of peripheral device accelerations. A peripheral identifier module creates a peripheral identifier comprising time interval values of time intervals between the peripheral time stamps. A broadcast module broadcasts a discovery signal with a signal identifier that comprises the peripheral identifier.

20 Claims, 6 Drawing Sheets

APPARATUS, SYSTEM, AND METHOD FOR ACCELERATION INITIATED ASSOCIATION

BACKGROUND OF THE INVENTION

1. Field of the Invention

This invention relates to initiating associations and more particularly relates to acceleration initiated associations.

2. Description of the Related Art

Wireless communications protocols such the BLUETOOTH® communications protocol maintained by the Bluetooth SIG, Inc. of Washington, D.C. or 802.11 communications protocol maintained by the Institute of Electrical and Electronic Engineers (IEEE) of New York, N.Y. are often used for communications between electronic devices. For example, a laptop computer may communicate with a printer using the BLUETOOTH® communications protocol, allowing the laptop computer to print documents at the printer.

Typically, two or more electronic devices must be associated before useful communications can take place. As used herein, electronic devices are associated when each device is configured to communicate with the other device and/or devices using a specified wireless communications protocol. For example, each electronic device may register an identifier of the other electronic device(s) in order to establish the association. In addition, associated electronic devices may share a secret such as a passkey.

Unfortunately, because of the increasing popularity of wireless electronic devices, there are often numerous other electronic devices within communications range of a first electronic device. As a result, the first electronic device may be presented with many association options. For example, a user of a laptop computer may be presented with the option of associating the laptop with a personal printer, several office printers, a neighboring personal printer, a wireless mouse, the user's cellular telephone, cellular telephones in neighboring offices, other laptop computers, and the like. The user may have difficulty identifying and associating only a desired electronic device, such as the wireless mouse, with the laptop computer.

SUMMARY OF THE INVENTION

From the foregoing discussion, there is a need for an apparatus, system, and method that initiate associations in response to acceleration. Beneficially, such an apparatus, system, and method would allow users to conveniently associate two or more electronic devices for wireless communication.

The present invention has been developed in response to the present state of the art, and in particular, in response to the problems and needs in the art that have not yet been fully solved by currently available association methods. Accordingly, the present invention has been developed to provide an apparatus, system, and method for initiating association that overcome many or all of the above-discussed shortcomings in the art.

The apparatus to initiate association is provided with a plurality of modules configured to functionally execute the steps of receiving a first knock command, creating a peripheral identifier, and broadcasting a discovery signal. These modules in the described embodiments include a peripheral knock module, a peripheral identifier module, and a broadcast module.

The peripheral knock module receives a first knock command from a first accelerometer of a peripheral device. The first knock command comprises a plurality of peripheral time stamps for a plurality of peripheral device accelerations.

The peripheral identifier module creates a peripheral identifier comprising time interval values of time intervals between the peripheral time stamps. The broadcast module broadcasts a discovery signal with a signal identifier that comprises the peripheral identifier. The apparatus initiates association for wireless communication in response to the first knock command.

A system of the present invention is also presented to initiate association. The system may be embodied in two or more electronic derives. In particular, the system, in one embodiment, includes a peripheral device and a host device.

The peripheral device includes a first accelerometer, a peripheral knock module, a peripheral identifier module, and a broadcast module. The host device includes a second accelerometer, a host knock module, a peripheral template module, a search module, and an association module.

The peripheral knock module receives a first knock command from the first accelerometer. The first knock command comprises a plurality of peripheral time stamps for a plurality of peripheral device accelerations.

The peripheral identifier module creates a peripheral identifier comprising time interval values of time intervals between the peripheral time stamps. The broadcast module broadcasts a discovery signal with a signal identifier that comprises the peripheral identifier.

The host knock module receives a second knock command from the second accelerometer. The second knock command comprises a plurality of host time stamps for a plurality of host device accelerations.

The peripheral template module creates a peripheral identifier template comprising time interval value ranges based on time intervals between the host time stamps. The search module searches for the discovery signal in response to the second knock command. The association module establishes a paired association between the host and the peripheral device if the peripheral identifier is within the ranges of the peripheral identifier template. The system initiates association between the host device and peripheral device in response to the first and second knock commands.

A method of the present invention is also presented for initiating association. The method in the disclosed embodiments substantially includes the steps to carry out the functions presented above with respect to the operation of the described apparatus and system. In one embodiment, the method includes receiving a first knock command, creating a peripheral identifier, and broadcasting a discovery signal.

A peripheral knock module receives a first knock command from a first accelerometer of a peripheral device. The first knock command comprises a plurality of peripheral time stamps for a plurality of peripheral device accelerations. A peripheral identifier module creates a peripheral identifier comprising time interval values of time intervals between the peripheral time stamps. A broadcast module broadcasts a discovery signal with a signal identifier that comprises the peripheral identifier. The method initiates association for wireless communication with the peripheral device in response to the first knock command.

References throughout this specification to features, advantages, or similar language do not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The present invention initiates an association between electronic devices in response to knock commands. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
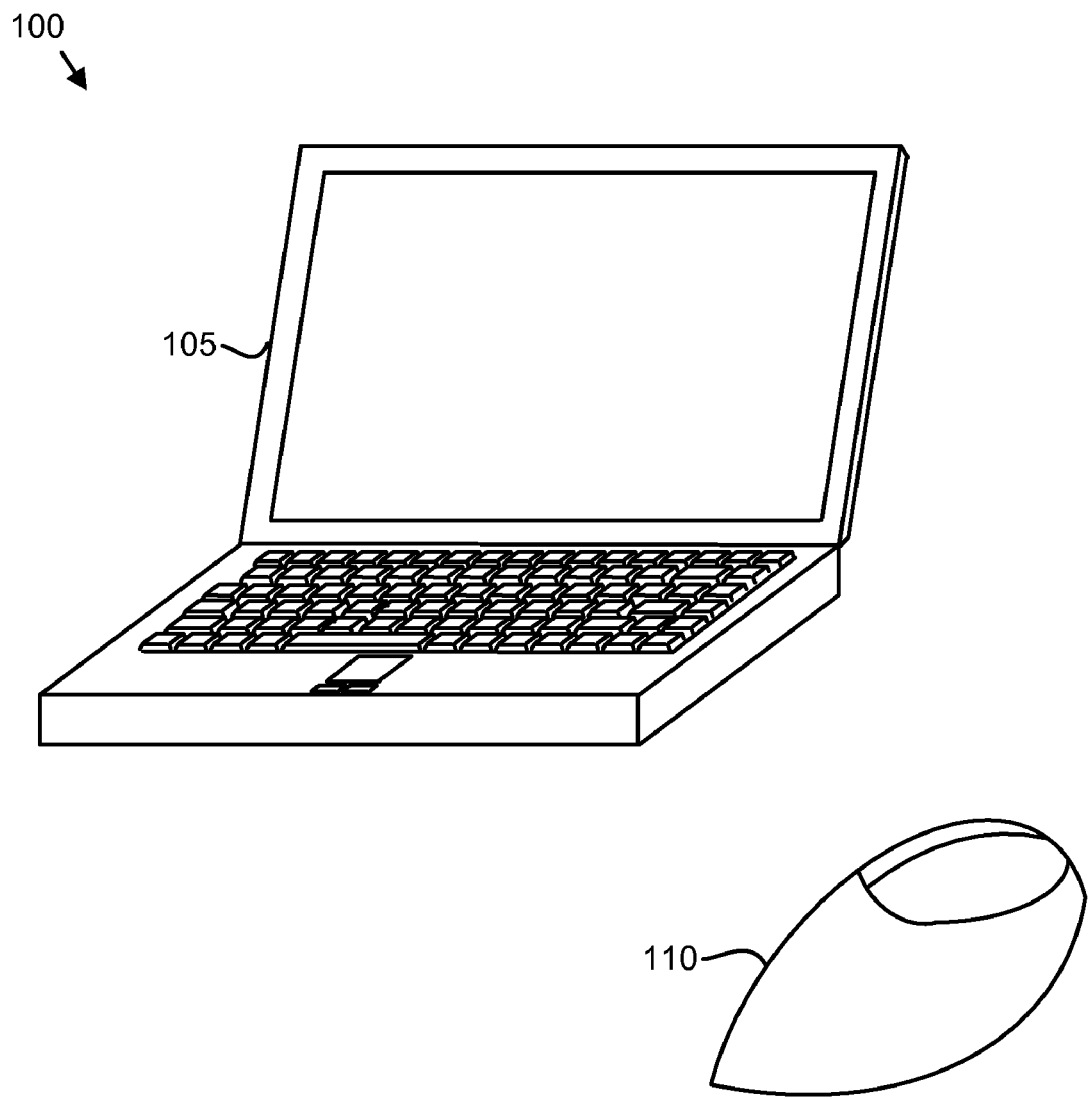
FIG. 1 is perspective drawing illustrating one embodiment of electronic devices in accordance with the present invention.

FIG. 1 is perspective drawing illustrating one embodiment of electronic devices 100 in accordance with the present invention. The devices 100 include a laptop computer 105 and a wireless mouse 110. One of skill in the art will recognize that the present invention may be practiced with many other devices including but not limited to personal digital assistants, cellular telephones, mobile email devices, displays, workstations, printers, scanners, cameras, recorders, music players, mobile entertainment devices, mobile game consoles, facsimile machines, and the like.

In one embodiment, the laptop computer 105 is a host device. The wireless mouse 110 may be a peripheral device. Both the laptop computer 105 and wireless mouse 110 may be configured to communicate over a wireless communications protocol such as a BLUETOOTH® communications protocol, a Universal Serial Bus communications protocol, an IEEE 802.11 communications protocol. One of skill in the art will recognize that the present invention may be practiced with other wireless communications protocols including but not limited to infrared communications protocols, sonic communications protocols, and the like.

In the past, associating the laptop computer 105 and the wireless mouse 110 over the wireless communications protocol might require manually identifying the laptop computer 105 and the wireless mouse 110 from a number of wireless electronic devices and initiating the association. The present invention simplifies initiating the association as will be described hereafter.

Figure 2:
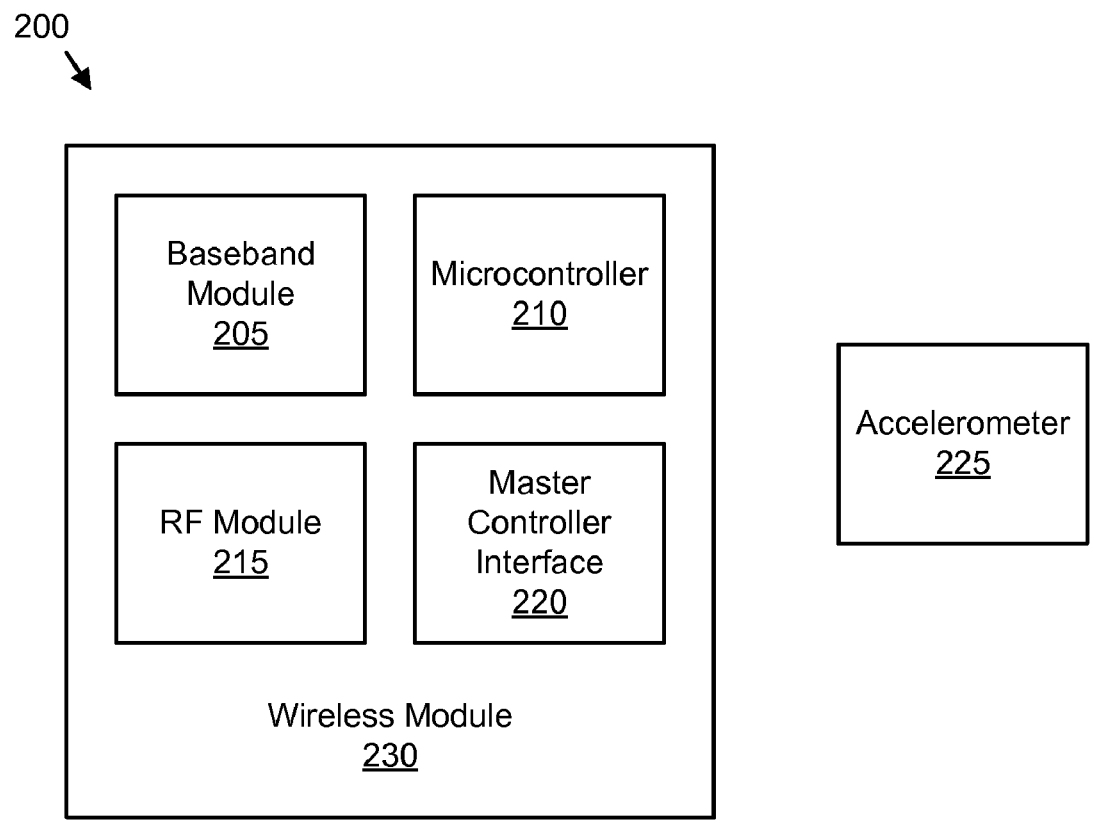
FIG. 2 is a schematic block diagram illustrating one embodiment of a knock command circuit of the present invention.

FIG. 2 is a schematic block diagram illustrating one embodiment of a knock command circuit 200 of the present invention. Both a host device and a peripheral device such as the laptop computer 105 and wireless mouse 110 of FIG. 1 include the knock command circuit 200. The circuit 200 includes wireless module 230 and an accelerometer 225.

The accelerometer 225 detects acceleration and may communicate an output signal encoding the acceleration information as will be described hereafter. The host device and/or peripheral device may use the accelerometer 225 to detect shocks. For example, the laptop computer 105 may quiesce a hard disk in response to shocks detected by the accelerometer 225. The accelerometer 225 may comprise a piezoelectric crystal.

The accelerometer 225 may also detect knock commands. A user issues a knock command by intentionally accelerating the device comprising the accelerator 225. For example, the user may issue a knock command to the laptop computer 105 by striking the laptop computer 105. The knock command may include multiple accelerations from multiple strikes arranged in a pattern. The user may select the pattern. Alternatively, the pattern may be pre-programmed.

The wireless module 230 may support a wireless communications protocol such as the IEEE 802.11 communications protocol, the BLUETOOTH® communications protocol, and the like. In the depicted embodiment, the wireless module 230 includes a baseband module 205, a microcontroller 210, a radio frequency (RF) module 215, and a master controller interface 220. The master controller interface 220 may communicate with a master controller within an electronic device. For example, the master controller interface 220 may communicate with a peripheral component interconnect (PCI) bus controller for the laptop computer 105 over a PCI bus. The master controller interface 220 may be fabricated of semiconductor gates.

The microcontroller 210 controls the wireless module 230. For example, the microcontroller 210 may manage communications using the BLUETOOTH® communications protocol. In addition, the microcontroller 210 generates data packets for transmission and interprets received data packets. The microcontroller 210 may include a sequencer and control store for instructions, each fabricated of semiconductor gates as is well known to those of skill in the art.

The baseband module 205 converts data packets to an analog signal for transmission. In addition, the baseband module 205 may convert received analog signals into digital data packets. The baseband module 205 may be fabricated of analog and digital semiconductor circuits.

The RF module 215 modulates analog signals from the baseband module 205 to radio frequencies and transmits the signals as radio signals. In addition, the RF module 215 may demodulate radio signals to analog signals and communicate the analog signals to the baseband module 205. The RF module 215 may be fabricated of analog semiconductor circuits.

Figure 3:
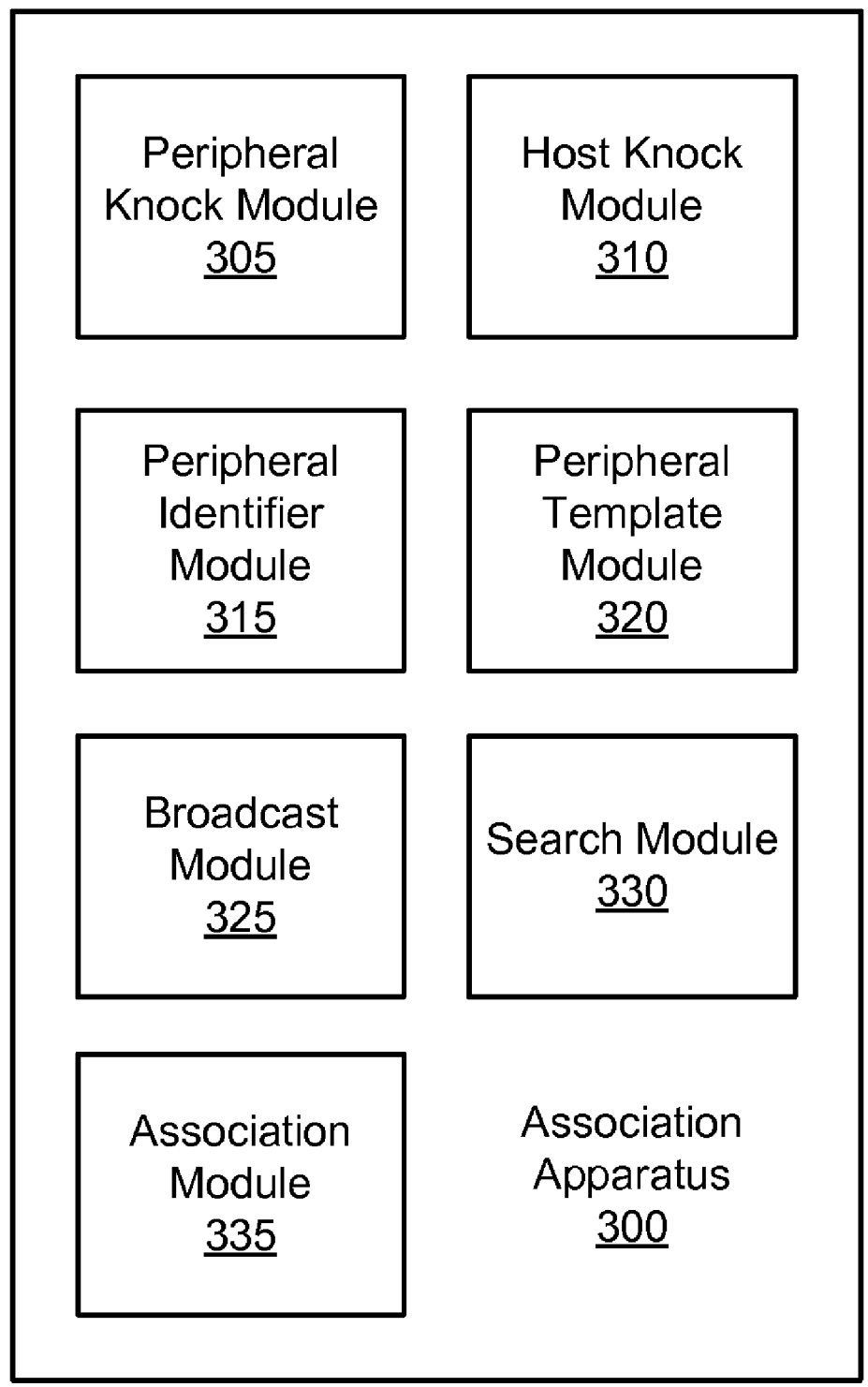
FIG. 3 is a schematic block diagram illustrating one embodiment of an association apparatus of the present invention.

FIG. 3 is a schematic block diagram illustrating one embodiment of an association apparatus 300 of the present invention. The apparatus 300 may be embodied in the host device such as the laptop computer 105 and the peripheral device such as the wireless mouse 110 of FIG. 1. In addition, the apparatus 300 may include the wireless module 230 and the accelerometer 225 of FIG. 2. The description of the apparatus 300 refers to elements of FIGS. 1-2, like numbers referring to like elements.

The peripheral knock module 305 receives a first knock command from a first accelerometer such as the accelerometer 225 of FIG. 2. In one embodiment, the peripheral knock module 305 comprises a plurality of edge detectors and timers fabricated of semiconductor circuits. In an alternate embodiment, the peripheral knock module 305 employs a processor such as the microcontroller 210 executing a computer readable program to create the peripheral identifier.

The peripheral identifier module 315 creates a peripheral identifier. The peripheral identifier may be plurality of time values. In one embodiment, the peripheral identifier module 315 comprises a hash circuit for creating a hash of digital values. In an alternate embodiment, the peripheral identifier module 315 employs a processor executing a computer readable program to create the peripheral identifier.

The broadcast module 325 broadcasts a discovery signal with a signal identifier that comprises the peripheral identifier. The broadcast module 325 may comprise the wireless module 230. In addition, the broadcast module 325 may employ a processor executing a computer readable program to broadcast the discovery signal. In a certain embodiment, the microcontroller 210 executes the computer readable program.

The host knock module 310 receives a second knock command from a second accelerometer that may be the accelerometer 225 of FIG. 2. In one embodiment, the host knock module 310 comprises a plurality of edge detectors and timers fabricated of semiconductor circuits. In an alternate embodiment, the host knock module 310 employs a processor such as a processor of the laptop computer 105 executing a computer readable program to receive the second knock command.

The peripheral template module 320 creates a peripheral identifier template. In one embodiment, the peripheral template module 320 comprises a hash circuit for creating a hash of digital values and one or more adders for adding a constant to each hash of the digital values. In an alternate embodiment, the peripheral template module 320 employs a processor such as a processor of the laptop computer 105 executing a computer readable program to create the peripheral identifier template.

The search module 330 searches for the discovery signal in response to the second knock command. The search module 330 may comprise the wireless module 230 operating under the direction of a computer readable program executing on a processor. In addition, the search module 330 may comprise a computer readable program executing on the laptop computer 105.

The association module 335 establishes a paired association between the host device and the peripheral device if the peripheral identifier is within the ranges of the peripheral identifier template. The association module 335 may comprise the wireless module 230 operating under the direction of a computer readable program executing on a processor such as the processor of the laptop computer 105.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 4:
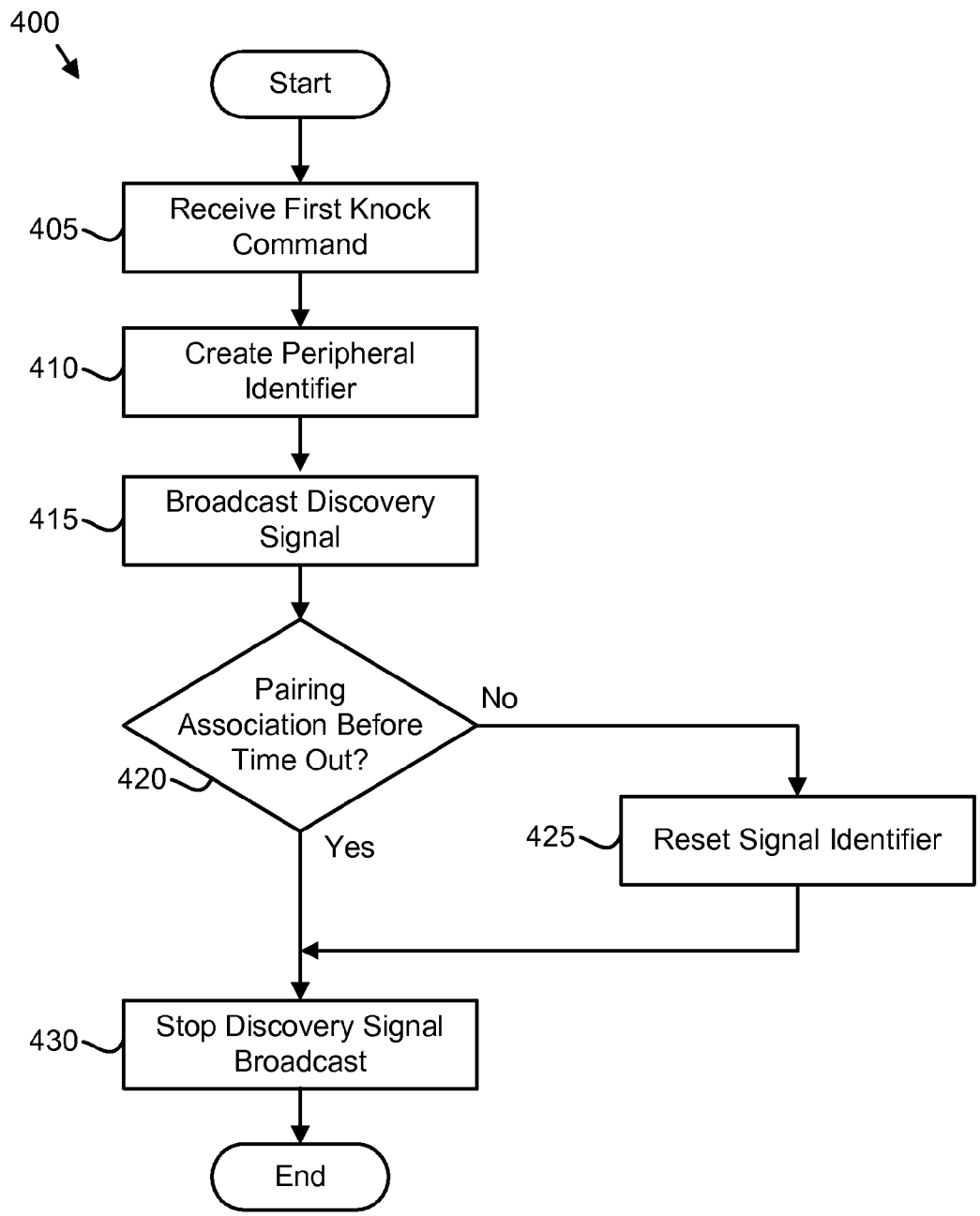
FIG. 4 is a schematic flow chart diagram illustrating one embodiment of an association initiation method of the present invention.

FIG. 4 is a schematic flow chart diagram illustrating one embodiment of an association initiation method 400 of the present invention. The method 400 substantially includes the steps to carry out the functions presented above with respect to the operation of the described apparatus and system of FIGS. 1-3. In one embodiment, the method 400 is implemented with a computer program product comprising a computer readable medium having a computer readable program. The computer readable program may be executed by a processor such as the microcontroller 210 and/or an embedded processor of the peripheral device. In an alternate embodiment, the method 400 is implemented by semiconductor hardware and/or semiconductor hardware working with a computer program product.

The peripheral knock module 305 receives 405 a first knock command from the first accelerometer. The first knock command comprises a plurality of peripheral time stamps for a plurality of peripheral device accelerations. For example, a user may strike the wireless mouse 110 three times against a table using a pattern of the user's choosing such as a one (1) second pause between the first and second strikes and a half (0.5) second pause between the second and third strikes. The peripheral knock module 305 may record a time stamp for each of three accelerations resulting from the three strikes against the table.

In one embodiment, the peripheral knock module 305 stops receiving knock commands after no knock command is received for a termination time interval. The termination time interval may be in the range of two to five seconds. For example, if no acceleration is detected after two seconds, the peripheral knock module 305 may stop receiving knock commands.

The peripheral identifier module 315 creates 410 a peripheral identifier comprising time interval values of time intervals between the peripheral time stamps. Continuing the example above, the peripheral identifier module 315 may create the peripheral identifier 1000, 500 from the time intervals recorded for the strikes against the table. The peripheral identifier may be the time intervals in milliseconds. The peripheral identifier module 315 may hash the peripheral time interval values to create 410 the peripheral identifier.

The broadcast module 325 broadcasts 415 a discovery signal with a signal identifier that comprises the peripheral identifier. In one embodiment, the peripheral identifier replaces a peripheral name in the signal identifier. In an alternate embodiment, the peripheral identifier is included in the signal identifier with the peripheral name. The discovery signal may be configured to invite a host device to associate with the peripheral device.

The broadcast module 325 determines 420 if the host device associates with the peripheral device within a time out time interval. If the broadcast module 325 determines 420 that no host device associates with the peripheral device within the time out time interval, the broadcast module 325 may reset 425 the signal identifier to an original peripheral name. After resetting 425 the signal identifier and/or after determining that the host device has associated with the peripheral device, the broadcast module 325 may stop 430 the broadcast of the discovery signal and the method 400 ends. The method 400 initiates association with a host device in response to a first knock command, creating a peripheral identifier that the user can easily replicate for the host device.

Figure 5:
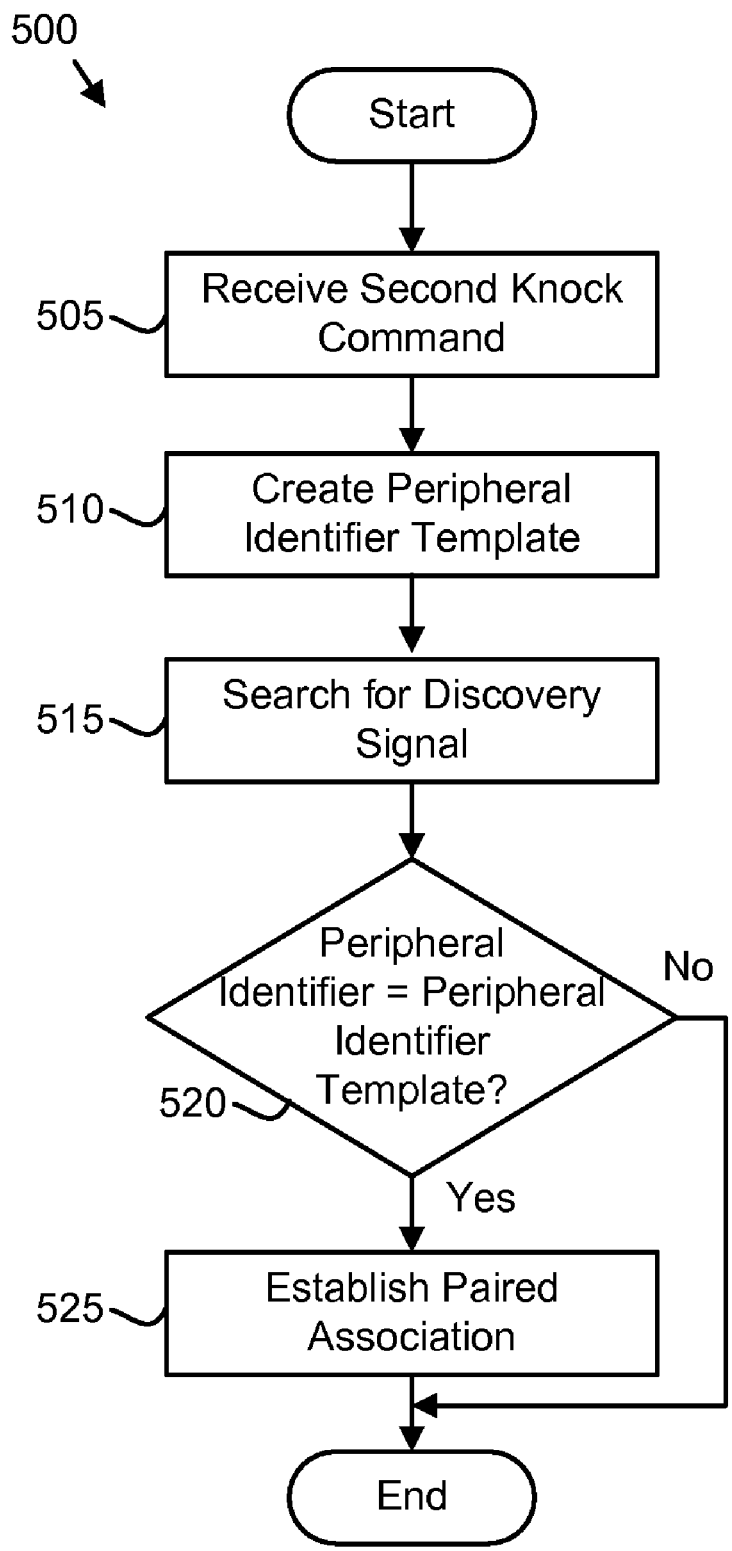
FIG. 5 is a schematic flow chart diagram illustrating one embodiment of an association method of the present invention.

FIG. 5 is a schematic flow chart diagram illustrating one embodiment of an association method 400 of the present invention. The method 500 substantially includes the steps to carry out the functions presented above with respect to the operation of the described apparatus and system of FIGS. 1-3. In one embodiment, the method 500 is implemented with a computer program product comprising a computer readable medium having a computer readable program. The computer readable program may be executed by a processor such as the processor of the laptop computer 105. In an alternate embodiment, the method 500 is implemented by semiconductor hardware and/or semiconductor hardware working with a computer program product.

The method 500 starts and the host knock module 310 receives 505 the second knock command from the second accelerometer. The second knock command comprises a plurality of host time stamps for a plurality of host device accelerations. Continuing the example above, the user may strike the laptop computer 105 three times with a fist, approximately replicating using the pattern used striking the wireless mouse 110 against the table. The host knock module 310 may record a host time stamp for each of three accelerations resulting from the three strikes to the laptop computer 105. In an alternate embodiment, the user may strike the peripheral device against the host device, concurrently issuing the first knock command to the peripheral device and the second knock command to the host device.

In one embodiment, the host knock module 310 stops receiving knock commands after no knock command is received within the termination time interval. For example, if no acceleration is detected after two seconds, the host knock module 310 may stop receiving knock commands.

The peripheral template module 320 creates 510 a peripheral identifier template comprising time interval value ranges based on time intervals between the host time stamps. The peripheral template module 320 may add and subtract a range value from the time intervals to form each range. The range value may be in the range of 50 to 500 milliseconds. For example, if 950 milliseconds elapse between the first and second strikes and 450 milliseconds may elapse between the second and third strikes, the peripheral template module 320 may add and subtract 100 milliseconds to each time interval. Thus the peripheral template modules 320 may create 510 the peripheral identifier template with the ranges 850-1050, 350-550 corresponding to a 850-1050 millisecond range and a 350-550 millisecond range in response the second knock command. In one embodiment, the peripheral template module 320 may hash the time interval values.

The search module 330 searches for the discovery signal in response to the second knock command. For example, the search module 330 may record the signal identifier from each discovery signal received after the second knock command. The search module 330 further determines 520 if the peripheral identifier from the signal identifier of each discovery signal is equivalent to the peripheral identifier template. If no peripheral identifier is equivalent to the peripheral identifier template, the method 500 ends.

If a peripheral identifier is equivalent to the peripheral identifier template, the association module 335 establishes 525 a paired association between the host device and the peripheral device broadcasting the peripheral identifier, and the method 500 ends. In one embodiment, the association module 335 establishes the paired association by recording the names and/or address of the host device and the peripheral device. In addition, the association module 335 may exchange a key between the host device and the peripheral device for use in secure communications.

Figure 6A:
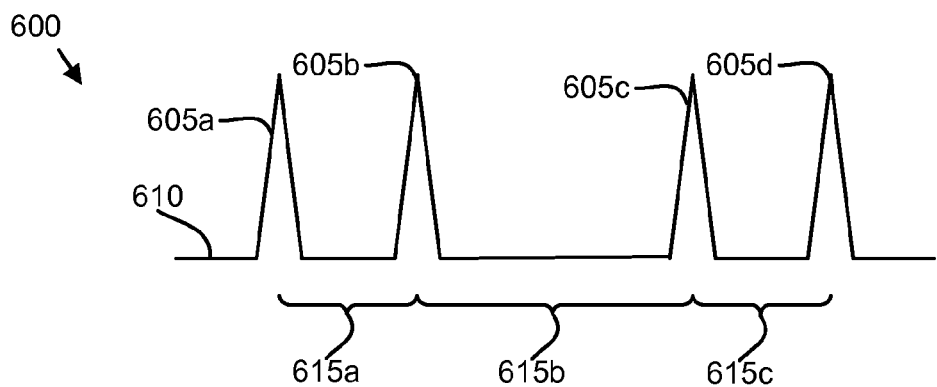
FIG. 6A is a schematic drawing illustrating one embodiment of peripheral accelerometer signals of the present invention.

FIG. 6A is a schematic drawing illustrating one embodiment of peripheral accelerometer signals 600 of the present invention. The accelerometer 225 of FIG. 2 may output a peripheral analog signal 610. The voltage of the signal 610 may increase to form spikes 605 when the accelerometer 225 is accelerated. For example, if the user strikes the wireless mouse 110 against the table four times, the signal 610 may include four spikes 605, each corresponding to a strike.

A time of each spike 605 may be recorded by a peripheral time stamp. Peripheral time intervals 615 are shown between each spike 605. The time intervals 615 may be calculated as the difference between two peripheral time stamps.

The peripheral identifier module 315 creates 410 the peripheral identifier from the time interval values of the time intervals 615. For example, the peripheral identifier module 315 may create 410 the peripheral identifier '040804' from the host time interval values, where '04,' '08,' and '04' are hashed values of time interval values.

Figure 6B:
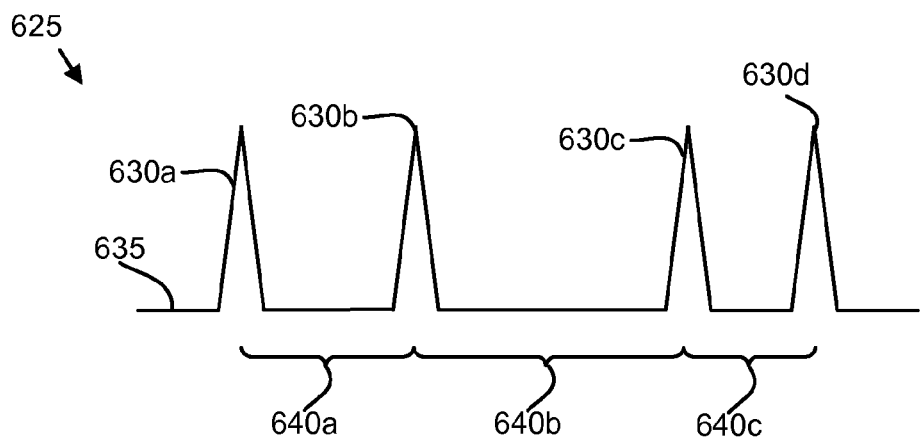
FIG. 6B is a schematic drawing illustrating one embodiment of time host acceleration signals of the present invention.

FIG. 6B is a schematic drawing illustrating one embodiment of host acceleration signals 625 of the present invention. The accelerometer 225 of FIG. 2 may output a host analog signal 635. The voltage of the signal 635 may increase to form spikes 630 when the accelerometer 225 is accelerated. For example, if the user strikes the laptop computer 105 four times, the signal 635 may include four spikes 630, each corresponding to a strike.

The time of each spike 630 may be recorded by a host time stamp. Host time intervals 640 are shown between each spike 630. The time intervals 640 may be calculated as the difference between two host time stamps.

Figure 6C:
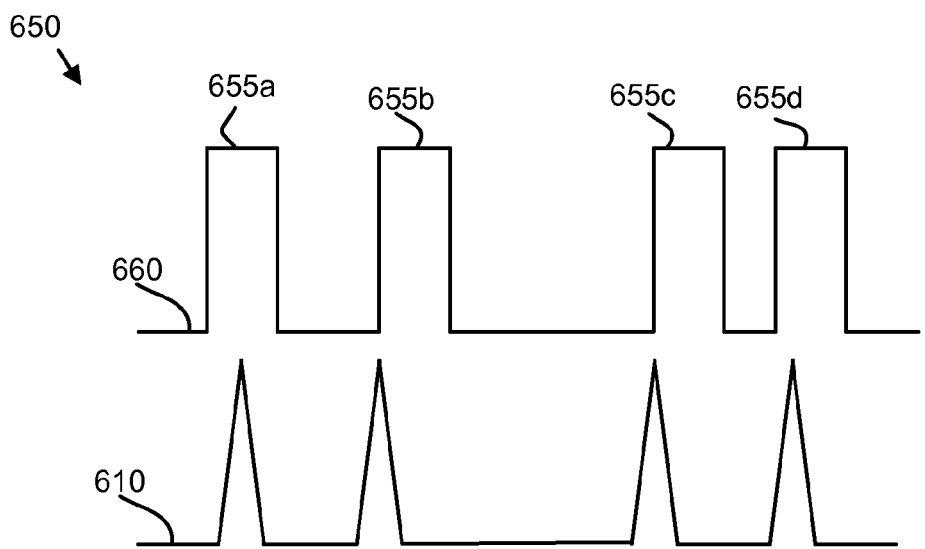
FIG. 6C is a schematic drawing illustrating one embodiment of peripheral identifier template of the present invention.

The peripheral template module 320 creates 510 a peripheral identifier template from the time interval value ranges based on the host time intervals 640 between the host time stamps. For example, the peripheral template module 320 may create 510 the peripheral identifier template of '040803-061005' where '04,' '08,' and '03' are lower boundaries for the first, second, and third knocks respectively and '06,' '10,' and '05' are upper boundaries for the first second, and third knocks respectively. Each value may represent a time interval such as 12 milliseconds FIG. 6C is a schematic drawing illustrating one embodiment of peripheral identifier template 650 of the present invention. The template 650 is a graphical representation of the '040803-061005' template described above. The template 650 includes ranges 655 where a corresponding peripheral knock command is considered a match. In the depicted embodiment, the template 650 is compared with the signal 610 from the knock commands issued to peripheral device. Although the signal 610 from the peripheral device knock commands and the template are not identical, the search module 330 may determines 520 that the peripheral identifier from the signal 610 is equivalent to the peripheral identifier template 650, allowing the association module 335 to establish 525 a paired relationship between the host device and the peripheral device.

The present invention allows the user to easily and intuitively issue knock commands that identify devices for association. Thus the user is spared from determining the identities of the host device and/or peripheral device, and can quickly initiate the association.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer readable medium storing a computer readable program, wherein the computer readable program when executed on a computer causes the computer to:
   receive a first knock command from a peripheral device having a first accelerometer, the first knock command comprising a plurality of peripheral time stamps for a plurality of accelerations of the peripheral device;
   create a peripheral identifier comprising time interval values of time intervals between the peripheral time stamps of the first knock command;
   broadcast a discovery signal with a signal identifier that comprises the peripheral identifier;
   receive a peripheral identifier template comprising time interval value ranges based on time intervals of a second knock command; and
   establish a paired association with the peripheral device if the peripheral identifier is within the ranges of the peripheral identifier template.

2. The computer readable medium of claim 1, the computer readable program further causing the computer to:
   receive the second knock command from a host device having a second accelerometer, the second knock command comprising a plurality of host time stamps for a plurality of accelerations of the host device;
   create the peripheral identifier template; and
   search for the discovery signal in response to the second knock command.

3. The computer readable medium of claim 2, wherein the first knock command and the second knock command are unified by striking the peripheral device against the host device, thereby causing concurrent first and second knock commands.

4. The computer readable medium of claim 2, the computer readable program further causing the computer to stop receiving knock commands after no knock command is received for a termination time interval.

5. The computer readable medium of claim 4, wherein the termination time interval is in the range of one to three seconds.

6. The computer readable medium of claim 2, the computer readable program further causing the computer to stop the broadcast of the discovery signal and reset the signal identifier to an original name if the host device does not establish the paired relationship within a time out time interval.

7. The computer readable medium of claim 2, wherein the discovery signal and the paired association employ a BLUETOOTH® communications protocol.

8. The computer readable medium of claim 2, wherein the discovery signal and the paired relationship employ a communications protocol selected from a Universal Serial Bus communications protocol, an infrared communications protocol, and an Institute of Electrical and Electronic Engineers (IEEE) 802.11 communications protocol.

9. The computer readable medium of claim 1, wherein the peripheral identifier comprises a hash of the peripheral time interval values.

10. An apparatus to initiate association, the apparatus comprising:
    a first computer readable medium storing a first computer readable program;
    a first processor executing the first computer readable program, the first computer readable program comprising
      a peripheral knock module receiving a first knock command from a peripheral device having a first accelerometer, the first knock command comprising a plurality of peripheral time stamps for a plurality of accelerations of the peripheral device;
    a peripheral identifier module creating a peripheral identifier comprising time interval values of time intervals between the peripheral time stamps of the first knock command;
    a broadcast module broadcasting a discovery signal with a signal identifier that comprises the peripheral identifier;
    the broadcast module receiving a peripheral identifier template comprising time interval value ranges based on time intervals of a second knock command; and
    an association module establishing a paired association with the peripheral device if the peripheral identifier is within the ranges of the peripheral identifier template.

11. The apparatus of claim 10, further comprising:
    a second computer readable medium storing a second computer readable program;
    a second processor executing the second computer readable program, the second computer readable program comprising:
      a host knock module receiving the second knock command from a host device having a second accelerometer, the second knock command comprising a plurality of host time stamps for a plurality of accelerations of the host device;
      a peripheral template module creating the peripheral identifier template; and
      a search module searching for the discovery signal in response to the second knock command.

12. The apparatus of claim 11, the search module further stopping receiving knock commands after no knock command is received for a termination time interval.

13. The apparatus of claim 11, the search module further stopping the broadcast of the discovery signal and resetting the signal identifier to an original name if the host device does not establish the paired relationship within a time out time interval.

14. The apparatus of claim 13, wherein the time out interval is in the range of two to five seconds.

15. The apparatus of claim 11, wherein the peripheral identifier comprises a hash of the peripheral time interval values.

16. A system to initiate association, the system comprising:
   a peripheral device comprising
       a first accelerometer;
       a first computer readable medium storing a first computer readable program;
       a first processor executing the first computer readable program, the first computer readable program comprising
           a peripheral knock module receiving a first knock command from the first accelerometer, the first knock command comprising a plurality of peripheral time stamps for a plurality of accelerations of the peripheral device;
           a peripheral identifier module creating a peripheral identifier comprising time interval values of time intervals between the peripheral time stamps of the first knock command;
           a broadcast module configured to broadcast a discovery signal with a signal identifier that comprises the peripheral identifier;
   a host device comprising
       a second accelerometer;
       a second computer readable medium storing a second computer readable program;
       a second processor executing the second computer readable program, the second computer readable program comprising
           a host knock module receiving a second knock command from the second accelerometer, the second knock command comprising a plurality of host time stamps for a plurality of accelerations of the host device;
           a peripheral template module creating a peripheral identifier template comprising time interval value ranges based on time intervals between the host time stamps of the second knock command;
           a search module searching for the discovery signal in response to the second knock command; and
           an association module establishing a paired association between the host and the peripheral device if the peripheral identifier is within the ranges of the peripheral identifier template.

17. The system of claim 16, wherein the discovery signal and the paired association employ a BLUETOOTH® communications protocol.

18. The system of claim 16, wherein the discovery signal and the paired relationship employ an IEEE 802.11 communications protocol.

19. The system of claim 16, wherein the host device is a laptop computer.

20. A method for deploying computer infrastructure, comprising integrating a computer-readable medium storing a computer readable program into a computing system, wherein the computer readable program when executed by the computing system performs the following:
   receiving a first knock command from a peripheral device having a first accelerometer, the first knock command comprising a plurality of peripheral time stamps for a plurality of accelerations of the peripheral device;
   creating a peripheral identifier comprising time interval values of time intervals between the peripheral time stamps of the first knock command;
   broadcasting a discovery signal with a signal identifier that comprises the peripheral identifier;
   receiving a second knock command from a host device having a second accelerometer, the second knock command comprising a plurality of host time stamps for a plurality of accelerations of the host device;
   creating a peripheral identifier template comprising time interval value ranges based on time intervals between the host time stamps of the second knock command;
   searching for the discovery signal in response to the second knock command;
   receiving the peripheral identifier template; and
   establishing a paired association between the host and the peripheral device if the peripheral identifier is within the ranges of the peripheral identifier template.

* * * * *